US008721920B2

(12) United States Patent
Deshpande et al.

(10) Patent No.: US 8,721,920 B2
(45) Date of Patent: *May 13, 2014

(54) OXYGEN SCAVENGING COMPOSITIONS AND PACKAGING COMPRISING SAID COMPOSITIONS

(75) Inventors: Girish Nilkanth Deshpande, Willowbrook, IL (US); Venkat Govindarajan, Naperville, IL (US); John M. Rost, Orland Park, IL (US); Alan Silverman, Washington Crossing, PA (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/720,049

(22) Filed: Mar. 9, 2010

(65) Prior Publication Data

US 2010/0154361 A1    Jun. 24, 2010

Related U.S. Application Data

(62) Division of application No. 11/354,661, filed on Feb. 15, 2006, now Pat. No. 7,691,290.

(60) Provisional application No. 60/652,888, filed on Feb. 15, 2005.

(51) Int. Cl.
*C06B 23/00* (2006.01)
*C06B 43/00* (2006.01)
*C09K 3/00* (2006.01)
*C08C 19/00* (2006.01)
*C08F 8/00* (2006.01)

(52) U.S. Cl.
USPC ............ 252/188.28; 252/186.24; 252/186.25; 252/383; 252/385; 428/35.8; 428/36.6; 428/219; 428/332; 428/483; 524/210; 524/431; 525/371

(58) Field of Classification Search
USPC .......... 252/188.28, 186.24, 186.25, 383, 385; 524/210, 431, 398, 538, 413; 525/371; 428/35.8, 36.6, 219, 332, 483
See application file for complete search history.

(56) References Cited

U.S. PATENT DOCUMENTS

| | | | |
|---|---|---|---|
| 4,536,409 A | | 8/1985 | Farrell et al. |
| 5,021,515 A | * | 6/1991 | Cochran et al. ............ 525/371 |
| 5,034,252 A | | 7/1991 | Nilsson et al. |
| 5,049,624 A | | 9/1991 | Adams et al. |
| 5,075,362 A | | 12/1991 | Hofeldt et al. |
| 5,159,005 A | * | 10/1992 | Frandsen et al. ............ 524/413 |
| 5,194,478 A | | 3/1993 | Frandsen et al. |
| 5,211,875 A | | 5/1993 | Speer et al. |
| 5,239,016 A | | 8/1993 | Cochran et al. |
| 5,281,360 A | | 1/1994 | Hong et al. |
| 5,639,815 A | | 6/1997 | Cochran et al. |
| 5,866,649 A | | 2/1999 | Hong et al. |
| 5,955,527 A | | 9/1999 | Cochran et al. |
| 6,057,013 A | | 5/2000 | Ching et al. |
| 6,083,585 A | | 7/2000 | Cahill et al. |
| 6,288,161 B1 | | 9/2001 | Kim et al. |
| 7,691,290 B2 | | 4/2010 | Deshpande et al. |
| 2001/0008662 A1 | | 7/2001 | Blinka et al. |
| 2003/0134966 A1 | | 7/2003 | Kim et al. |
| 2004/0219320 A1 | | 11/2004 | Cochran et al. |
| 2005/0106343 A1 | | 5/2005 | Kim et al. |
| 2006/0180790 A1 | * | 8/2006 | Deshpande et al. ..... 252/188.28 |

FOREIGN PATENT DOCUMENTS

| | | |
|---|---|---|
| EP | 0 301 719 | 2/1989 |
| EP | 0301719 A1 | 2/1989 |
| EP | 0 335 520 | 10/1989 |
| EP | 0335520 A1 | 10/1989 |
| EP | 0794053 A2 | 9/1997 |
| EP | 1 655 238 A1 | 5/2006 |
| EP | 1 655 238 A1 | 5/2006 |
| JP | 51-100143 U | 8/1976 |

(Continued)

OTHER PUBLICATIONS

International Search Report and Written Option issued on Nov. 15, 2007 for Intl. App. No. PCT/US2006/05216, filed on Feb. 15, 2006 (Applicant—Constar International, Inc.; pp. 1-12).

(Continued)

*Primary Examiner* — Bijan Ahvazi
(74) *Attorney, Agent, or Firm* — Ballard Spahr LLP

(57) ABSTRACT

The instant invention concerns a composition comprising a base polymer, at least one compound of the formula $E\text{-}(L\text{-}E)_x$ wherein:

E is

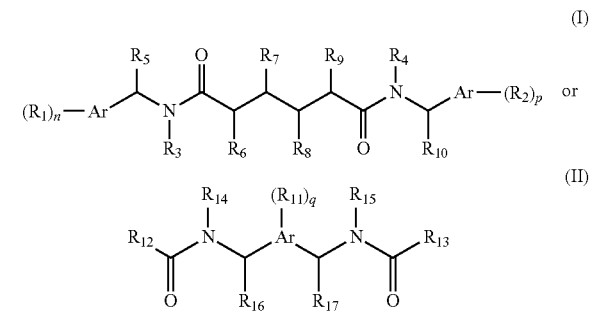

and L is a linking group; and at least one transition metal in a positive oxidation state. The invention also concerns packages containing walls comprising such compositions, methods of forming such packages, and methods of packaging an oxygen-sensitive item within such a package.

14 Claims, 19 Drawing Sheets

(56) References Cited

FOREIGN PATENT DOCUMENTS

| JP | 51-100143 | * | 9/1976 |
|----|-----------|---|--------|
| JP | 51100143 | | 9/1976 |
| WO | WO-89/01012 A1 | | 2/1989 |
| WO | WO-2005/023530 A1 | | 3/2005 |
| WO | WO 2005/023530 A1 | | 3/2005 |
| WO | WO-2006/088889 A2 | | 8/2006 |

OTHER PUBLICATIONS

Notice of Allowance issued on Nov. 18, 2009 for U.S. Appl. No. 11/354,661, filed on Feb. 15, 2006 (Inventor—Geshpande et al.; pp. 1-8).
RCE/Response to Final Office Action filed on Oct. 22, 2009 for U.S. Appl. No. 11/354,661, filed on Feb. 15, 2006 (Inventor—Geshpande et al.; pp. 1-9).
RCE/Response to Final Office Action filed on Oct. 20, 2009 for U.S. Appl. No. 11/354,661, filed on Feb. 15, 2006 (Inventor—Geshpande et al.; pp. 1-10).
Exmainer Interview Summary issued on Sep. 11, 2009 for U.S. Appl. No. 11/354,661, filed on Feb. 15, 2006 (Inventor—Geshpande et al.; pp. 1).
Advisory Action issued on Aug. 28, 2009 for U.S. Appl. No. 11/354,661, filed on Feb. 15, 2006 (Inventor—Geshpande et al.; pp. 1-4).
Response to Final Office Action filed on Aug. 14, 2009 for U.S. Appl. No. 11/354,661, filed on Feb. 15, 2006 (Inventor—Geshpande et al.; pp. 1-14).
Final Office Action issued on Jun. 19, 2009 for U.S. Appl. No. 11/354,661, filed on Feb. 15, 2006 (Inventor—Geshpande et al.; pp. 1-11).
Response to Non-Final Office Action filed on Apr. 17, 2009 for U.S. Appl. No. 11/354,661, filed on Feb. 15, 2006 (Inventor—Geshpande et al.; pp. 1-14).
Non-Final Office Action issued on Feb. 2, 2009 for U.S. Appl. No. 11/354,661, filed on Feb. 15, 2006 (Inventor—Geshpande et al.; pp. 1-7).
Response to Restriction Requirement filed on Dec. 12, 2008 for U.S. Appl. No. 11/354,661, filed on Feb. 15, 2006 (Inventor—Geshpande et al.; pp. 1-12).
Restriction Requirement issued on Nov. 12, 2008 for U.S. Appl. No. 11/354,661, filed on Feb. 15, 2006 (Inventor—Geshpande et al.; pp. 1-10).
Notice of Abandonment issued on Feb. 7, 2012 for U.S. Appl. No. 11/816,203, filed on Apr. 29, 2009 (Inventor—Geshpande et al.; pp. 1-2).
Non-Final Office Action issued on Jul. 5, 2011 for U.S. Appl. No. 11/816,203, filed on Apr. 29, 2009 (Inventor—Geshpande et al.; pp. 1-6).

* cited by examiner

3 % Monomer

3% Nylon

OXYGEN SCAVENGING COMPOSITIONS AND PACKAGING COMPRISING SAID COMPOSITIONS

RELATED APPLICATIONS

This application is a divisional of U.S. application Ser. No. 11/354,661 filed, Feb. 15, 2006, which claims benefit of U.S. application No. 60/652,888 filed Feb. 15, 2005, the contents of which are incorporated herein.

FIELD OF THE INVENTION

The present invention relates to substantially transparent compositions that comprise a base polymer, an oxidizable organic component, and a transition metal. The invention also concerns use of such compositions in the construction of packaging for oxygen sensitive materials.

BACKGROUND OF THE INVENTION

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Use of certain polyamides in combination with a transition metal is known to be useful as the oxygen scavenging material. One particularly useful polyamide is MXD6 which contains meta-xylene residues in the polymer chain. See, for example, U.S. Pat. Nos. 5,639,815; 5,049,624; and 5,021,515.

Other oxygen scavengers include potassium sulfite (U.S. Pat. No. 4,536,409), unsaturated hydrocarbons (U.S. Pat. No. 5,211,875), and ascorbic acid derivatives (U.S. Pat. No. 5,075,362).

In barrier layers of packaging walls that are made from blends of oxygen scavenging materials with base polymer resins such as PET, haze can result due to such factors as: the immiscibility of the scavenging materials with the base polymer resins, and the inability to create by mechanical blending means disperse-phase domains that are so small as not to interfere with the passage of light therethrough; and the adverse influence of the scavenging material on the crystallization behavior of PET base resin. One approach to minimizing such haze is careful selection of base resin to improve dispersibility of the scavenger material and, thus, reduce, but not substantially eliminate, haze; and to minimize the adverse crystallization effect. This approach may undesirably narrowly restrict the choice of base polymer resin. Another approach is to use compositions that serve as compatibilizers to reduce haze. These approaches add cost to the layer and the compatibilizer adds an additional material that must be evaluated for its suitability for contact with food. There is a need in the art for barrier materials which provide high oxygen scavenging capability and are substantially transparent without use of the aforementioned measures.

SUMMARY OF THE INVENTION

The invention relates to a composition which comprises:
(a) at least one base polymer;
(b) at least one non-polymeric oxidizable organic component present in an amount of about 0.10 to 10 weight present of the composition and the component comprising at least one compound of the formula $E\text{-}(L\text{-}E)_x$ wherein:
E is

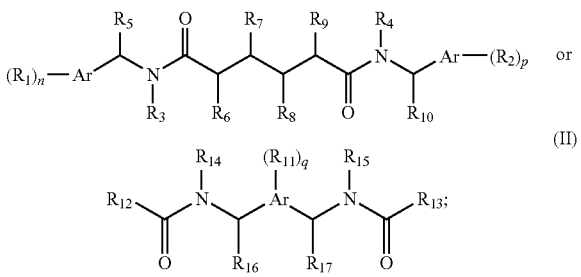

L is a linking group of the formula $-(O-R_{21})_z-O-$, $-(NH-R_{21})_z-NH-$, $-(NH-C(=O)R_{22})_t-NH$, $-NH-R_{25}-NH(C(=O)R_{26}NHR_{25}NH)_u-$, $-(O-R_{23}-O-R_{24}-C(=O))_s-O-$ where L is attached to a carbon atom of Ar (for example, replaces a H atom of the Ar) in structure (I) or where $R_{12}$ or $R_{13}$ of structure (II) is L;
x is 0, 1, or 2;
Ar is aryl or heteroaryl;
$R_1$, $R_2$, and $R_{11}$ are each independently, H, $C_1\text{-}C_{12}$ alkyl, $C_1\text{-}C_6$ alkoxy, $C_6\text{-}C_{20}$ aryloxy, hydroxy, $C_2\text{-}C_6$ alkenyl, $NR_{19}R_{20}$, acetyl, nitro, glyceryl, carbohydrate, $-C(=O)H$, L, or two $R_1$ or two $R_2$ groups can form a group of the formula $O-R_{18}-O$;
$R_3$, $R_4$, $R_{14}$, and $R_{15}$ are each H;
$R_5$ to $R_{10}$, $R_{16}$, and $R_{17}$ are each, independently, H or $C_1\text{-}C_3$ alkyl;
$R_{12}$ and $R_{13}$ are each, independently, H, $C_1\text{-}C_6$ alkyl, $C_6\text{-}C_{20}$ aryl, $C_1\text{-}C_6$ alkoxy, or L;
$R_{18}$ is $C_2\text{-}C_6$ alkyl;
$R_{19}$ and $R_{20}$ are each, independently, H, $C_1\text{-}C_6$ alkyl, or $C_6\text{-}C_{20}$ aryl;
$R_{21}$ and $R_{24}$ are each, independently, $C_1\text{-}C_6$ alkyl;
$R_{22}$, $R_{23}$, $R_{25}$ and $R_{26}$ are each, independently, $C_1\text{-}C_6$ alkyl or $C_6\text{-}C_{20}$ aryl;
n and p are independently 0 or an integer from 1 to 5;
q is 0 or an integer from 1 to 4;
s and z are, independently, 1, 2, or 3;
t and u are, independently, 1 or 2; and
(c) at least one transition metal in a positive oxidation state, the metal being present in the composition in an amount of 10 to 400 ppm.

Some compounds have $R_1$, $R_2$, and $R_{11}$ as $C_1\text{-}C_6$ alkyl.
In some embodiments, the composition is of the formula:

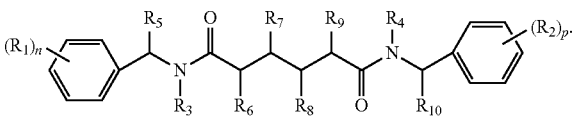

In some compounds, n and p are each 0, 1, or 2. In certain compounds, $R_1$ and $R_2$ are each independently H, $C_1\text{-}C_4$ alkyl, hydroxy, $C_1\text{-}C_3$ alkoxy, or carbohydrate. Some compositions have $R_1$ and $R_2$ are each independently H, methyl, ethyl, hydroxy, methoxy, ethoxy, or glucose.

In some embodiments, $R_5$ to $R_{10}$ are H. In certain embodiments, $R_1$ and $R_2$ are each H.

Some compositions are of the formula:

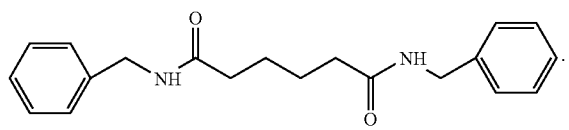

The invention also relates to compositions having the formula:

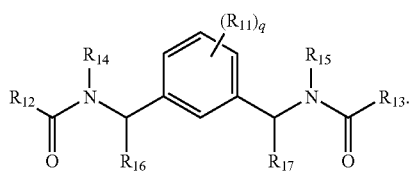

In some embodiments, $R_{16}$ and $R_{17}$ are H. In certain embodiments, each $R_{11}$ is independently H, $C_1$-$C_4$ alkyl, hydroxy, or $C_1$-$C_3$ alkoxy, or carbohydrate. In some compositions, each $R_{11}$ is independently H, methyl, ethyl, hydroxy, methoxy, or ethoxy.

Some compounds have the formula:

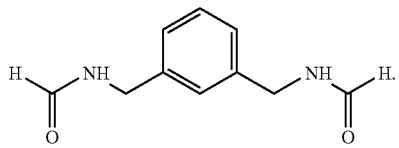

Some preferred embodiments have a concentration of transition metal of 30 to 150 ppm. In some embodiments, cobalt is the transition metal. In certain embodiments, the at least one transition metal comprises cobalt and zinc.

In some preferred embodiments, the base polymer comprises a polyester polymer. In certain of these embodiments, the polyester polymer is polyethylene terephthalate.

Some embodiments have the oxidizable organic component present in an amount of about 1 to about 10 weight percent based on the weight of the composition. In other embodiments, the oxidizable organic component is present in an amount of about 1 to about 5 weight percent based on the weight of the composition. In still other embodiments, the oxidizable organic component is present in an amount of about 1 to about 3 weight percent based on the weight of the composition.

The composition can additionally comprise one or more of colorant, filler, crystallization aid, impact modifier, surface lubricant, denesting agent, stabilizer, ultraviolet light absorbing agent, or dyestuff for example.

In some embodiments, the invention concerns a wall for a package, where the wall comprising a composition comprising:
at least one base polymer;
at least one non-polymeric oxidizable organic component that is present in an amount of about 0.10 to 10 weight present of the composition and the component comprising at least one compound described herein; and
at least one transition metal in a positive oxidation state that is present in the composition in an amount of 10 to 400 ppm. In some compositions, the wall is a single layer. In some embodiments, the wall is multilayer. In the latter embodiment, a first layer can be disposed radially outward from a second layer that contains the oxidizable organic component.

In another embodiment, the invention relates to a method for packaging an oxygen sensitive material comprising:
(a) preparing a packing having a wall which comprises a composition comprising:
a base polymer;
a non-polymeric oxidizable organic component that is present in an amount of about 0.10 to 10 weight present of the composition and the component comprising at least one compound described herein; and
at least one transition metal in a positive oxidation state that is present in the composition in an amount of 10 to 400 ppm;
(b) introducing the oxygen sensitive material into the package; and
(c) closing the package.

In yet other embodiments, the invention concerns a method for producing a container having a wall with oxygen barrier properties comprising:
(a) providing a polymer mixture comprising at least one base polymer containing at least one non-polymeric oxidizable organic component that is present in an amount of about 0.10 to 10 weight present of the composition and the component comprising at least one compound described herein; the mixture having at least one transition metal in a positive oxidation state, the metal being present in the composition in an amount of 10 to 400 ppm;
(b) forming the product of step (a) into a wall; and
(c) forming a container which comprises the wall.

In further embodiments, the invention concerns a process for making an article comprising:
(a) forming a melt by combining the following ingredients in a melt processing zone:
a base polymer,
a non-polymeric oxidizable organic component that is present in an amount of about 0.10 to 10 weight present of the composition and the component comprising at least one compound described herein;
at least one transition metal in a positive oxidation state that is present in the composition in an amount of 10 to 400 ppm; and
(b) forming an article from the melt.

In certain embodiments, the article is a preform, a sheet, a film, a cup, a jar, or a bottle.

In preferred embodiments of the invention, the compositions described herein are used in monolayer bottles. These compositions are advantageous in substantially eliminating haze in such compositions compared to other commercial oxygen scavengers used in monolayer applications. In other embodiments the compositions are used in one or more layers of a multi-layer wall of a package, giving protection of the contents against oxygen without adding haziness to the wall.

DETAILED DESCRIPTION OF ILLUSTRATIVE EMBODIMENTS

Figure 1:
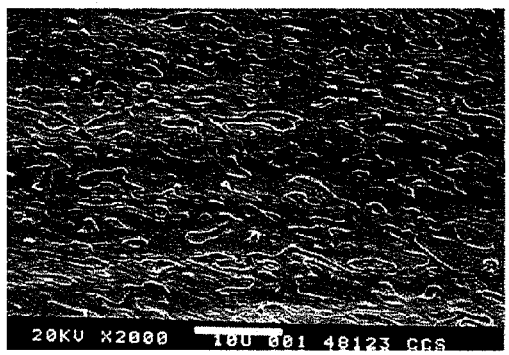
FIG. 1 shows dispersion of 3% monomer-1 in the PET matrix measured using standard SEM technique used for evaluating the dispersion of MXD6 nylon in PET versus a dispersion comprising MXD6 (a nylon that is made by Mitsubishi Gas Chem) at 3% nominal loading.
Figure 1:
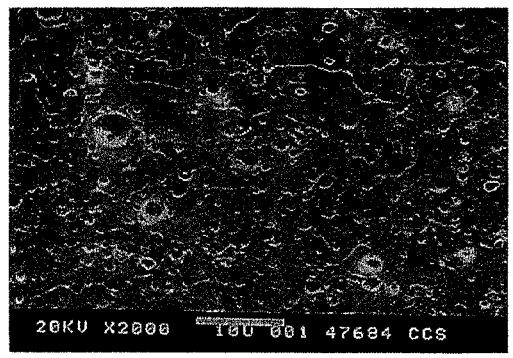

The present invention concerns compositions that are useful in the manufacture of packaging for oxygen sensitive materials. In some embodiments, the invention concerns a polyester polymer composition, preforms, and blow molded containers with good oxygen scavenging properties as well as substantially reduced haze compared to current commercial PET compositions containing an oxygen scavenger comprised of MXD6 nylon or of Amosorb, an $O_2$ scavenger containing polybutadiene oligomers.

It is preferred that the non-polymeric oxidizable organic component of the instant invention have a high degree of affinity for polyesters.

In certain preferred embodiments, the invention concerns compositions that contain a base polymer, a transition metal in a positive oxygen state, and at least one non-polymeric oxidizable organic component present in an amount of about 0.10 to 10 weight present of the composition and the component comprising at least one compound of the formula E-(L-E)$_x$ wherein:

E is

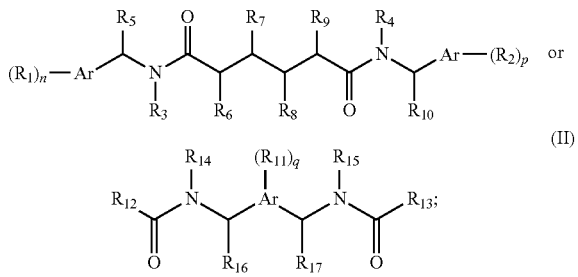

L is a linking group of the formula —(O—R$_{21}$)$_z$—O—, —(NH—R$_{21}$)$_z$—NH—, —(NH—C(=O)R$_{22}$)$_t$—NH, —NH—R$_{25}$—NH(C(=O)R$_{26}$NHR$_{25}$NH)$_u$—, —O—R$_{23}$—O—R$_{24}$—C(=O)$_s$—O— where L is attached to a carbon atom of Ar in structure (I) or where R$_{12}$ or R$_{13}$ of structure (II) is L;

x is 0, 1, or 2;

Ar is aryl or heteroaryl;

R$_1$, R$_2$, and R$_{11}$ are each independently, H, C$_1$-C$_{12}$ alkyl, C$_1$-C$_6$ alkoxy, C$_6$-C$_{20}$ aryloxy, hydroxy, C$_2$-C$_6$ alkenyl, NR$_{19}$R$_{20}$, acetyl, nitro, glyceryl, carbohydrate, —C(=O)H, L, or two R$_1$ or two R$_2$ groups can form a group of the formula —O—R$_{18}$—O;

R$_3$, R$_4$, R$_{14}$, and R$_{15}$ are each H;

R$_5$ to R$_{10}$ and R$_{16}$, and R$_{17}$ are each, independently, H or C$_1$-C$_3$ alkyl;

R$_{12}$ and R$_{13}$ are each, independently, H, C$_1$-C$_6$ alkyl, C$_6$-C$_{20}$ aryl, C$_1$-C$_6$ alkoxy, or L;

R$_{18}$ is C$_2$-C$_6$ alkyl;

R$_{19}$ and R$_{20}$ are each, independently, H, C$_1$-C$_6$ alkyl, or C$_6$-C$_{20}$ aryl;

R$_{21}$ and R$_{24}$ are each, independently, C$_1$-C$_6$ alkyl;

R$_{22}$, R$_{23}$, R$_{25}$ and R$_{26}$ are each, independently, C$_1$-C$_6$ alkyl or C$_6$-C$_{20}$ aryl;

n and p are independently 0 or an integer from 1 to 5;

q is 0 or an integer from 1 to 4;

s and z are, independently, 1, 2, or 3; and t and u are, independently, 1 or 2.

The term "alkyl" refers to a substituted or unsubstituted aliphatic hydrocarbon chain. Alkyl groups have straight and branched chains. In some embodiments, alkyls have from 1 to 12 carbon atoms or 1 to 6 carbon atoms, unless explicitly specified otherwise. Alkyl groups include, bur are not limited to methyl, ethyl, propyl, isopropyl, butyl, 1-butyl and t-butyl. Specifically included within the definition of "alkyl" are those aliphatic hydrocarbon chains that are optionally substituted.

The term "alkoxy," as used herein, refers to the group R—O— where R is an alkyl group as defined herein.

The term "aryl" is defined herein as an aromatic carbocyclic moiety of up to 20 carbon atoms. In some embodiments, aryl groups have 6-20 carbon atoms or 6-14 carbon atoms. Aryls may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl. anthryl, phenanthryl, fluorenyl, indanyl, biphenylenyl, acenaphthenyl, and acenaphthylenyl. In some embodiments, phenyl is a preferred aryl. Aryl groups may also be optionally substituted with one or more substituents.

The term "aryloxy" refers to the group —O—Ar where Ar is an aryl group as defined herein.

The term "heteroaryl" refers to an aromatic heterocyclic ring system, which may be a single ring (monocyclic) or multiple rings (bicyclic, up to three rings) fused together or linked covalently and having for example 5 to 20 ring members. The rings may contain from one to four hetero atoms selected from nitrogen (N), oxygen (O), or sulfur (S), wherein the nitrogen or sulfur atom(s) are optionally oxidized, or the nitrogen atom(s) are optionally substituted (e.g., by alkyl such as methyl) or quarternized. Any suitable ring position of the heteroaryl moiety may be covalently linked to the defined chemical structure. Exemplary heteroaryl groups include, but are not limited to, pyrryl, furyl, pyridyl, pyridine-N-oxide, 1,2,4-thiadiazolyl, pyrimidyl, thienyl, isothiazolyl, imidazolyl, tetrazolyl, pyrazinyl, pyrimidyl, quinolyl, isoquinolyl, thiophenyl, benzothienyl, isobenzofuryl, pyrazolyl, indolyl, purinyl, carbazolyl, benzimidazolyl, and isoxazolyl.

Optional substituents for alkyl, alkenyl, aryl, or heteroaryl groups are well known to those skilled in the art. These substituents include alkyl, alkoxy, —$SR_{19}$, aryloxy, hydroxy, $NR_{19}R_{20}$, acetyl, cyano, nitro, glyceryl, and carbohydrate, or two substituents taken together may be linked as an -alkylene- group to form a ring. $R_{19}$ and $R_{20}$ are as defined herein.

It is believed that some composition, under certain circumstances, can produce an amount of benzylaldehyde derivative upon decomposition. As such, it is desirable that any substituents on aryl groups be ones that do not produce a pronounced flavor or odor. Such compositions are easily determined by one skilled in the art and can be taken into considerations when selecting substituents for aryl groups.

A surprising result of the oxygen scavenging reaction of some of these oxygen scavenger materials comprising benzyl amides is that the decomposition products resulting from the catalytic oxidation by transition metal in the positive oxidation state, according to this invention, (some decomposition products may also result from melt processing of the materials) are benzyl aldehydes, which may be toxicologically innocuous. Benzaldehyde, from the oxidative decomposition of Monomer I, is a natural flavorant, and is generally recognized as safe for use in foods or for packaging in contact with foods. This innocuousness is highly desirable in food packaging. Other benzyl amines may be chosen such that the decomposition products are aldehydes that are believed to be innocuous. These include 3-methoxy-4-hydroxybenzaldehyde (also known as vanillaldehye or vanillin), 3-ethoxy-2-hydroxybenzaldehyde, 4-hydroxy-3-methylbenzaldehyde, 4-hydroxy-3,5-dimethoxybenzaldehyde, 4-hydroxybenzaldehyde-3-sulfonic acid sodium salt, (1,1'-bihenyl)-4-carboxaldehyde, 2-methoxybenzaldehyde 4-nitropheynylhydrazone, 3,4,5-triacetoxybenzaldehyde, 2-hydroxy-5-methoxybenzaldehyde, 3-benzoxy-4-methoxybenzaldehyde, 2-formylbenzenesulfonic acid sodium salt, 4-dodecyloxyenzaldehyde, benzaldehyde-p-sulfonic acid sodium salt, 3-benzoxybenzaldehyde, 3-phenoxybenzaldehyde, 5-nitrovanillin, ethyl vanillin beta-D-glucopyranoside, 1,4-benzodioxan-6-carboxaldehyde, 3,4-didecyloxybenzaldehyde, 4-benzyloxy-3-methoxybenzaldehyde, N-ethyl-N-hydroxyethyl-2-methyl-4-aminobenzaldehyde, 2,4-dinitrobenzaldehyde, 4-methoxybenzaldehyde-3-sulfonic acid sodium salt, 4-benzyloxybenzaldehyde, 4-(4-nitrobenzyloxy)benzaldehyde, 4-octylbenzaldehyde, 2-hexyloxybenzaldehyde, 3,4-didodecyloxybenzaldehyde, 3,4-dioctyloxybenzaldehyde, 3,5-di-tert-butyl-4-hydroxybenzaldehyde, and 3-(4-tert-butylphenoxy)benzaldehyde. While the effectiveness in packaging applications as oxygen scavengers may be somewhat different from one substituted benzyl amine to another, the advantages in the aldehyde decomposition product having reduced sensory detection limits may be a good tradeoff, and this can be determined by reasonable experimentation and testing with the products to be packaged.

In general, it is believed that larger benzaldehydes and their salts have less intense flavors. It is also believed that benzaldehydes having at least one sugar substituent will have less flavor than unsubstituted analogs. Examples of suitable sugars include glucose, sucrose, and lactose.

"Carbohydrate" as used herein refers to monosaccharides, disaccharides, and trisaccharides. Suitable carbohydrates include glucose, sucrose, and lactose. A carbohydrate substituent may be bound at any suitable position.

The term "alkenyl" is defined herein as ($C_2$-$C_{20}$) straight chain or branched-chain bivalent hydrocarbon moiety derived from an alkane or alkene that is mono or polyunsaturated. Such groups include those in the E or Z configurations and all possible combinations of E and Z configurations. Some preferred alkylene chains have 2-7 carbon atoms.

The carbon number as used in the definitions recited herein refers to carbon backbone and carbon branching and does not include any carbon atoms that are contained in the optional substituents.

Compositions of the instant invention comprise a base polymer. In some embodiments, the base polymer is a polyester. In certain embodiments, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles. In certain preferred embodiments, the polyester is polyethylene terephthalate (PET).

Examples of suitable polyester polymers include polyethylene terephthalate homopolymers and copolymers modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less (collectively referred to for brevity as "PET") and polyethylene naphthalate homopolymers and copolymers modified with a cumulative amount of with less than about 15 mole %, or about 10 mole % or less, or about 8 mole % or less, of one or more polycarboxylic acid modifiers or modified less than about 60 mol %, or less than about 50 mole %, or less than about 40 mole %, or less than about 15 mole %, or about 10 mole % or less, or about 8 mole % or less of one or more hydroxyl compound modifiers (collectively referred to herein as "PEN"), and blends of PET and PEN. A modifier polycarboxylic acid compound or hydroxyl compound is a compound other than the compound contained in an amount of at least about 85 mole %. The preferred polyester polymer is polyalkylene terephthalate, and most preferred is PET.

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

Other base polymers may be used with the instant invention. One example is polypropylene.

The transition metal used in the instant compositions is a metal in the positive oxidation state. It should be noted that it is contemplated that one or more such metals may be used. In some embodiments, cobalt is added in +2 or +3 oxidation state. In some embodiments, it is preferred to use cobalt in the +2 oxidation state. In certain embodiments, copper in the +2 oxidation state is utilized. In some embodiments, rhodium in the +2 oxidation state is used. In certain embodiments, zinc may also be added to the composition. Preferred zinc compounds include those in a positive oxidation state.

Suitable counter-ions to the transition metal cations include carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, chlorides, dioxides, hydroxides, nitrates, phosphates, sulfates, or silicates among others.

In some embodiments, levels of at least about 10 ppm, or at least about 50 ppm, or at least about 100 ppm of metal can achieve suitable oxygen scavenging levels. The exact amount of transition metal used in an application can be determined by trials that are well within the skill level of one skilled in the art. In some embodiments involving wall applications (as opposed to master batch applications where more catalyst is used), it is preferred to keep the level of metal below about 300 ppm and, in other embodiments, preferably below about 250 ppm. In master batch compositions, the level of transition metal may range from about 1000 to about 10,000 ppm. In some preferred embodiments, the range is from about 2000 to about 5000 ppm.

The transition metal or metals may be added neat or in a carrier (such as a liquid or wax) to an extruder or other device for making the article, or the metal may be present in a concentrate or carrier with the oxidizable organic component, in a concentrate or carrier with a base polymer, or in a concentrate or carrier with a base polymer/oxidizable organic component blend. Alternatively, at least a portion of the transition metal may be added as a polymerization catalyst to the melt phase reaction for making the base polymer (a polyester polymer in some embodiments) and be present as residual metals when the polymer is fed to the melting zone (e.g. the extrusion or injection molding zone) for making the article such as a preform or sheet. It is desirable that the addition of the transition metal does not substantially increase the intrinsic viscosity (It.V) of the melt in the melt processing zone. Thus, transition metal or metals may be added in two or more stages, such as once during the melt phase for the production of the polyester polymer and again once more to the melting zone for making the article.

The compositions of the instant invention comprise at least one non-polymeric oxidizable organic component present in an amount of about 0.10 to 10 weight present of the composition and the component comprising at least one compound of the formula E-(L-E)$_x$ wherein:

E is

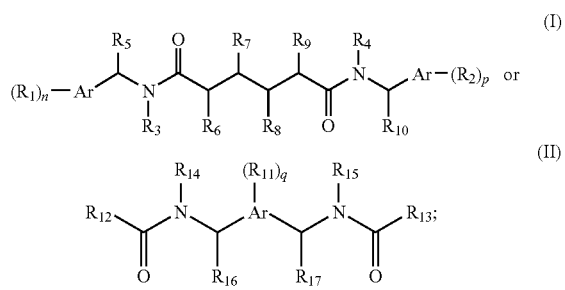

L is a linking group of the formula —(O—R$_{21}$)$_z$—O—, —(NH—R$_{21}$)$_z$—NH—, —(NH—C(=O)R$_{22}$)$_t$—NH, —NH—R$_{25}$—NH(C(=O)R$_{26}$NHR$_{25}$NH)$_u$—, —(O—R$_{23}$—O—R$_{24}$—C(=O)$_s$—O— where L is attached to a carbon atom of Ar in structure (I) or where R$_{12}$ or R$_{13}$ of structure (II) is L;

x is 0, 1, or 2;

Ar is aryl or heteroaryl;

R$_1$, R$_2$, and R$_{11}$ are each independently, H, C$_1$-C$_{12}$ alkyl, C$_1$-C$_6$ alkoxy, C$_6$-C$_{20}$ aryloxy, hydroxy, C$_2$-C$_6$ alkenyl, NR$_{19}$R$_{20}$, acetyl, nitro, glyceryl, carbohydrate, —C(=O)H, L, or two R$_1$ or two R$_2$ groups can form a group of the formula O—R$_{18}$—O;

R$_3$, R$_4$, R$_{14}$, and R$_{15}$ are each H;

R$_5$ to R$_{10}$ and R$_{16}$, and R$_{17}$ are each, independently, H or C$_1$-C$_3$ alkyl;

R$_{12}$ and R$_{13}$ are each, independently, H, C$_1$-C$_6$ alkyl, C$_6$-C$_{20}$ aryl, C$_1$-C$_6$ alkoxy, or L;

R$_{18}$ is C$_2$-C$_6$ alkyl;

R$_{19}$ and R$_{20}$ are each, independently, H, C$_1$-C$_6$ alkyl, or C$_6$-C$_{20}$ aryl;

R$_{21}$ and R$_{24}$ are each, independently, C$_1$-C$_6$ alkyl;

R$_{22}$, R$_{23}$, R$_{25}$ and R$_{26}$ are each, independently, C$_1$-C$_6$ alkyl or C$_6$-C$_{20}$ aryl;

n and p are independently 0 or an integer from 1 to 5;

q is 0 or an integer from 1 to 4;

s and z are, independently 1, 2, or 3; and t and u are, independently 1 or 2.

In some embodiments, the compositions comprise at least one monomer of the formula:

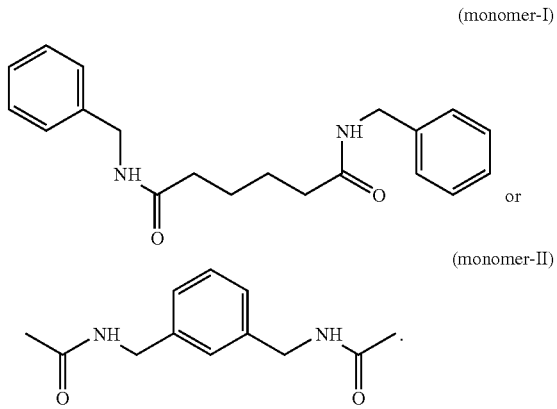

At least one of these monomers described herein normally will be used in an amount of about 0.1 to about 10 weight percent in an article based on the weight of the composition. In some preferred embodiments, the monomer(s) will be present in an amount of about 1 to about 5 weight percent based on the weight of the composition. In other embodiments, the monomer(s) will be present in an amount of about 1 to about 3 weight percent based on the weight of the composition.

In master batch solutions the amount of monomer will typically be from about 10 to about 90 weight percent based on the weight of the composition. In some preferred embodiments, the amount of monomer will be from about 20 to about 80 weight percent based on the weight of the composition.

The compounds described herein, including monomers I and II, can be made by standard synthetic methods known to those skilled in the art. For example, one could derive monomer-I by reacting adipic acid and benzyl amine. Monomer-II could be made by reacting m-xylene diamine with a formic acid derivative.

In addition, to the monomers discussed in the preceding paragraph. The compositions of the invention can contain one or more additional oxygen scavenging materials. These materials may be polymeric, oligomeric, or monomeric in nature. One suitable material is MXD6, a polyamide, that is discussed in U.S. Pat. No. 5,639,815. Other suitable materials are polyolefins which can be added as blended material or as a unit within the base polymer moiety. See, for example, U.S. Pat. No. 6,083,585.

The composition may also include other components such as pigments, fillers, crystallization aids, impact modifiers, surface lubricants, denesting agents, stabilizers, ultraviolet light absorbing agents, metal deactivators, nucleating agents such as polyethylene and polypropylene, phosphate stabilizers and dyestuffs. Other additional components are well known to those skilled in the art and can be added to the existing composition so long as they do not negatively impact the performance of the compositions. In particular, it is known that certain metal ions are to be avoided since they tend to poison the catalytic effect of the transition metal catalysts of the here-in described invention. Typically, the total quantity of such components will be less than about 10% by weight relative to the whole composition. In some embodiments, the amount of these optional components is less than about 5%, by weight relative to the total composition.

A common additive used in the manufacture of polyester polymer compositions used to make stretch blow molded bottles is a reheat additive because the preforms made from the composition must be reheated prior to entering the mold for stretch blowing into a bottle. Any of the conventional reheat additives can be used, such additives include various forms of black particles, e.g. carbon black, activated carbon, black iron oxide, glassy carbon, and silicon carbide; the gray particles such as antimony, and other reheat additives such as silicas, red iron oxide, and so forth.

In many applications, not only are the packaging contents sensitive to the ingress of oxygen, but the contents may also be affected by UV light. Fruit juices and pharmaceuticals are two examples of such contents. Accordingly, in some embodiments, it is desirable to incorporate into the polyester composition any one of the known UV absorbing compounds in amounts effective to protect the packaged contents so long as the compounds do not negatively impact performance.

The instant compositions can be made by mixing a base polymer (PET, for example) with the oxidizable organic component and the transition metal composition. Such compositions can be made by any method known to those skilled in the art. In certain embodiments, some or part of the transition metal may exist in the base polymer prior to mixing. This residual metal, for example, can exist from the manufacturing process of the base polymer. In some embodiments, the base polymer, the oxidizable organic component and the transition metal are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some embodiments, the mixing can be just prior to the melt process zone. In other embodiments, one or more ingredients can be premixed in a separate step prior to bringing all of the ingredients together.

The oxidizable organic component can be added in pure form or may be treated with a low molecular weight organic wax like compound to prepare a prill or bead like material for ease of dosing during the injection molding process.

In some embodiments, the invention concerns use of the compositions described herein as a component of a wall that is used in a package for oxygen sensitive materials. The necessary scavenging capacity of a package will generally have to be greater for walls that have a greater permeance in the absence of scavenging additives. Accordingly, a commercially useful effect is harder to achieve when inherently higher permeance materials are used, unless the layer is protected, such as with a layer of polymer or other material, to reduce the $O_2$ flux reaching the scavenging composition. Such constructions may find particular applicability where the requirement is for rapid headspace-$O_2$ evacuation, or in containers for $O_2$-sensitive products that also require walls with low permeance to water vapor.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

When the instant compositions are used in a wall or as a layer of a wall, the permeability of the composition for oxygen is advantageously not more than about 3.0, or about 1.7, or about 0.7, or about 0.2, or about 0.03 $cm^3$ mm/($m^2$ atm day). The permeability of the composition provided by the present invention is advantageously not more than about three-quarters of that in the absence of oxygen-scavenging properties. In some embodiments, the permeability is not more than about one half, one-tenth in certain embodiments, one twenty-fifth in other embodiments, and not more than one-hundredth in yet other embodiments of that in the absence of oxygen-scavenging properties. The permeability in the absence of oxygen-scavenging properties is advantageously not more than about 17 $cm^3$ mm/($m^2$ atm day), or about 10, and or about 6. A particularly good effect can be achieved for such permeabilities in the range from about 0.5, or about 1.0, to 10, or about 6.0, $cm^3$ mm/($m^2$ atm day). Measurements of oxygen permeation can be made by methods described, for example, in U.S. Pat. No. 5,639,815, the contents of which are incorporated herein in its entirety.

In another aspect, the instant composition can be used as a master batch for blending with a polymer or a polymer containing component. In such compositions, the concentration of the oxidizable organic component and the transition metal will be higher to allow for the final blended product to have suitable amounts of these components. The master batch may also contain an amount of the polymer to which the master batch is to be blended with. In other embodiments, the master batch may contain a polymer that is compatible with the polymer that the master batch is to be blended with.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well know to those skilled in the art.

The time period for which the permeability is maintained can be extended by storing the articles in sealed containers or under an inert atmosphere such as nitrogen prior to use with oxygen sensitive materials. Such a scheme may prove beneficial where performs or rolls of film or sheet are to be stored for long periods prior to further packaging-conversion operations.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are molding generally, injection molding, stretch blow molding, extrusion, thermoforming, extrusion blow molding, and (specifically for multilayer structures) co-extrusion and lamination using adhesive tie layers. Orientation, e.g. by stretch blow molding, of the polymer is especially attractive with phthalate polyesters because of the known mechanical advantages that result.

Specific articles include preforms, containers and films for packaging of food, beverages, cosmetics, pharmaceuticals, and personal care products where a high oxygen barrier is needed. Examples of beverage containers for which the instant invention are particularly useful are bottles for containing juices, sport drinks, beer or any other beverage where oxygen detrimentally affects the flavor, fragrance, performance (prevent vitamin degradation), or color of the drink. The compositions of the instant invention are also particularly useful as a sheet for thermoforming into rigid packages, and as films for flexible-package structures. Rigid packages include food trays and lids. Examples of food tray applications include dual ovenable food trays, or cold storage food trays, both in the base container and in the lidding (whether a thermoformed lid or a flexible film), where the freshness of the food contents can decay with the ingress of oxygen. The compositions of the instant invention also find use in the manufacture of cosmetic containers and containers for pharmaceuticals or medical devices.

The package walls of the instant invention can be a single layer or a multilayer constructions. In some embodiments using multilayer walls, the outer and inner layers may be structural layers with one or more further layers. Any of the layers may contain the oxygen scavenging material of this invention. In some embodiments, the outer and inner layers comprise and polyolefin or a polyester. In the most-preferred embodiments, a single layer design is preferred. Such a design may have advantages in simplicity of manufacture and cost, without sacrifice of the transparency of the polyester base polymer.

As used herein, the terms "a", "an", "the" and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of base polymer, oxidizable organic component, and transition metal that will be diluted, typically with at least additional base polymer, prior to forming an article. As such, the concentrations of oxidizable organic component and transition metal are higher than in the formed article.

As used herein, the term "combining" includes blending or reacting the components that are combined.

EXAMPLES

The instant invention is illustrated by the following examples that are not intended to limit the scope of the invention. N,N'-bis(phenylmethyl) Hexane diamide (referred to as Monomer-I, CAS Registry No: 25344-24-5) and N,N'-[1,3-phenylenebis(methylene)]bis Acetamide (referred to as Monomer-II, CAS Registry No: 131711-99-4) were prepared by Sigma Aldrich.

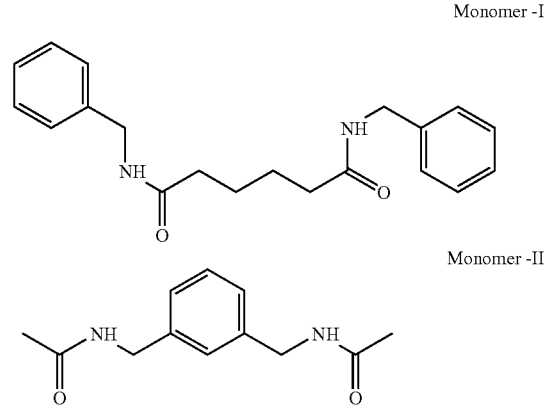

Example 1

Extruded strips were prepared using a bench-top Killion extruder (with typical extruder output rate between 8-10 lbs/hour) for evaluating oxygen scavenging potential using Oxy-Sense™ for Monomer-I and Monomer-II. The temperature profile across different extruder zones used was typical to that used for PET (about 525° F.). Extruded films were cut into thin strips and about 2 g samples for each formulation were sealed into 22 mL glass vials and stored at elevated temperature (70° C.). The % oxygen depletion inside the vials over time was monitored using commercially available Oxy-Sense™ instrument. Different formulations and their respective code names are given below:

1. PET+3% 6007+100 ppm Co carboxylate powder
   (Code: T10)

2. PET+3% Monomer-I+100 ppm Co carboxylate
   powder (Code: M-I 3-100)

3. PET+3% Monomer-I+200 ppm Co carboxylate
   powder (Code: M-I 3-200)

4. PET+5% Monomer-I+100 ppm Co carboxylate
   powder (Code: M-I 5-100)

5. PET+5% Monomer-I+200 ppm Co carboxylate
   powder (Code: M-I 5-200)

6. PET+3% Monomer-II+100 ppm Co carboxylate
   powder (Code: M-II 3-100)

7. PET+3% Monomer-II+200 ppm Co carboxylate
   powder (Code: M-II 3-200)

8. PET+5% Monomer-II+100 ppm Co carboxylate
   powder (Code: M-II 5-100)

9. PET+5% Monomer-II+200 ppm Co carboxylate
   powder (Code: M-II 5-200)

Figure 2:
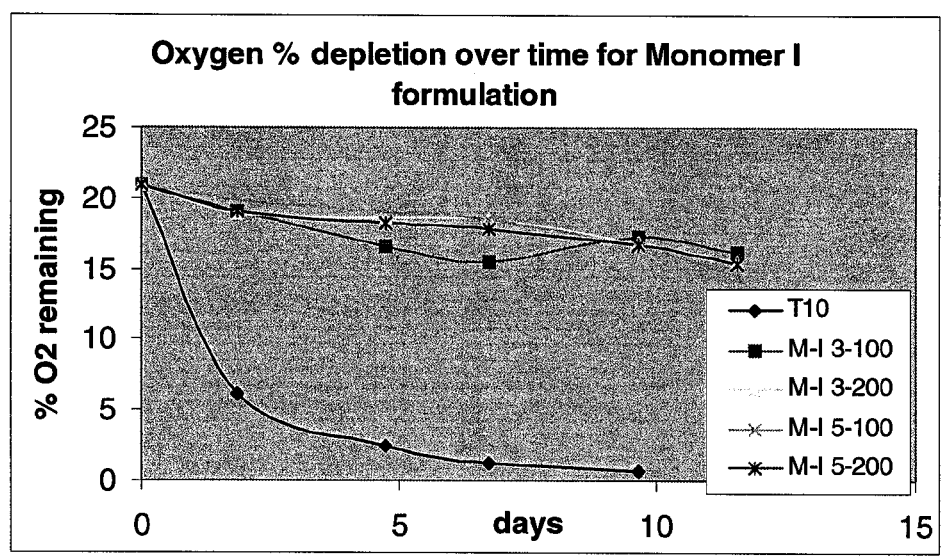
FIGS. 2 and 3 show the % oxygen depletion in the vials over time of samples having monomers I and II.
Figure 3:
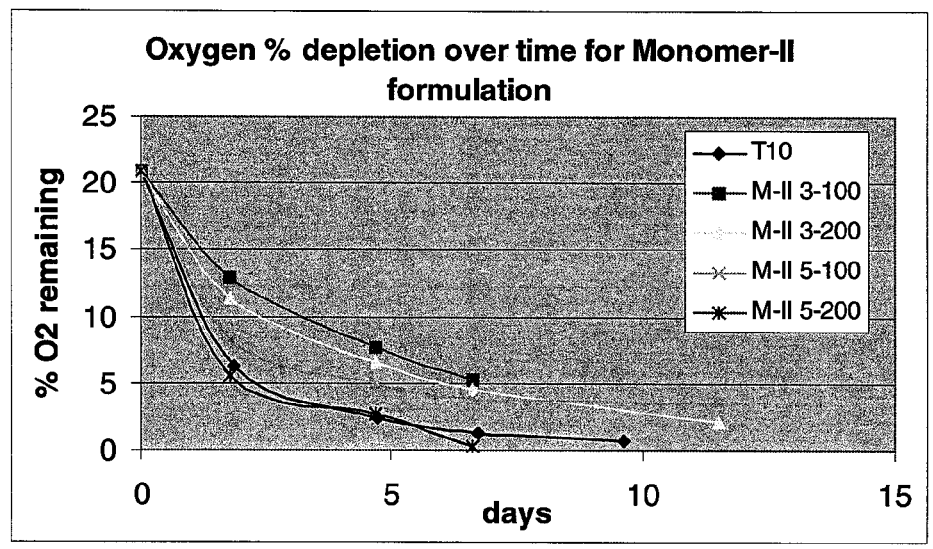

Actual Monomer I and Monomer II content as well as the cobalt content in the extruded strips were not verified. Graphs in FIGS. 2 and 3 show the % oxygen depletion in the vials over time. It can be seen that while Monomer-I shows limited scavenging, some of the Monomer-II compositions scavenge as well as the Monoxbar™ control sample (T10).

It is evident that Monomer-I and Monomer-II have oxygen scavenging potential based on Oxy-Sense™ data and further testing was performed by manufacturing actual blown containers.

Example 2

Preforms were injection molded on a 2 cavity Husky LX160 PET injection molding machine. Preforms were made with the following formulations:

Heat Wave™(Voridian) PET+3% Monomer-I+75 ppm
Co carboxylate powder

Heat Wave PET+3% Monomer-II+75 ppm Co carboxylate powder

PET, Monomer-I (in powder form) and Cobalt carboxylate mixture (cobalt neodeconate (Co NDA, CAS # 27253-31-2) and cobalt propionate (CAS# 1560-69-6) mixture with a 20.5% Co metal content) were tumble blended in a bucket and fed into the machine hopper. Actual final composition in the preform was not verified. Bottles were blown on the unit cavity Re-heat and blow lab machine for oxygen transmission rate (OTR) and haze measurement.

Figure 4:
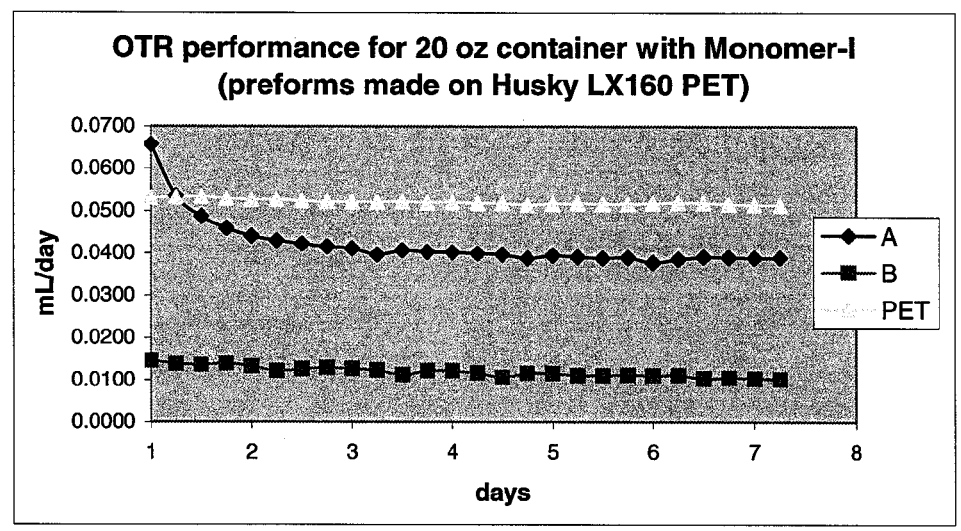
FIG. 4 shows oxygen permeation of bottles containing monomer-I that were mounted 2 days after manufacture and 69 days after manufacture.

Monomer-I Trial Results:

20 oz bottles were blown form preforms and stored empty at STP conditions prior to testing. Two sets of the empty bottles were mounted on an oxygen permeation measuring device—similar to MoCon Oxtran analyzer. The first set (A) were mounted 2 days after manufacture, and the second set (B) were mounted 69 days after manufacture. Results are shown in FIG. 4 where:

A. 2 days after manufacture (—◇—)
B. 69 days after manufacture (—□—).

Monomer-I Trial Results (Contd.):

A dispersion of Monomer-I in the PET matrix was measured using standard SEM technique used for evaluating the dispersion of nylon in PET. A comparison of dispersion for the Monomer-I/PET blend compared to MXD6 nylon/PET blend, each at 3% nominal loading, is shown in FIG. 1. It appears that there is significant compatibilization between PET and monomer matrix compared to that of the MXD6 blend. Percent haze was measured using the hazemeter and the values for Monomer-I blend bottle compared to that of a plain PET bottle.

Typical haze levels for a 3% Monoxbar formulation would be >15%. It is obvious that there has been significant improvement in the haze level using the Monomer-I as the barrier material. The blend formulation is not perceptibly different in transparency compared to plain PET container.

| Composition | Haze, % (ASTM D1005) |
|---|---|
| 97% PET, 3% MXD6 Blend | >15 |
| 97% PET, 3% Monomer-I blend | 2.7 |
| Control 100% PET | 3.6 |

Figure 5:
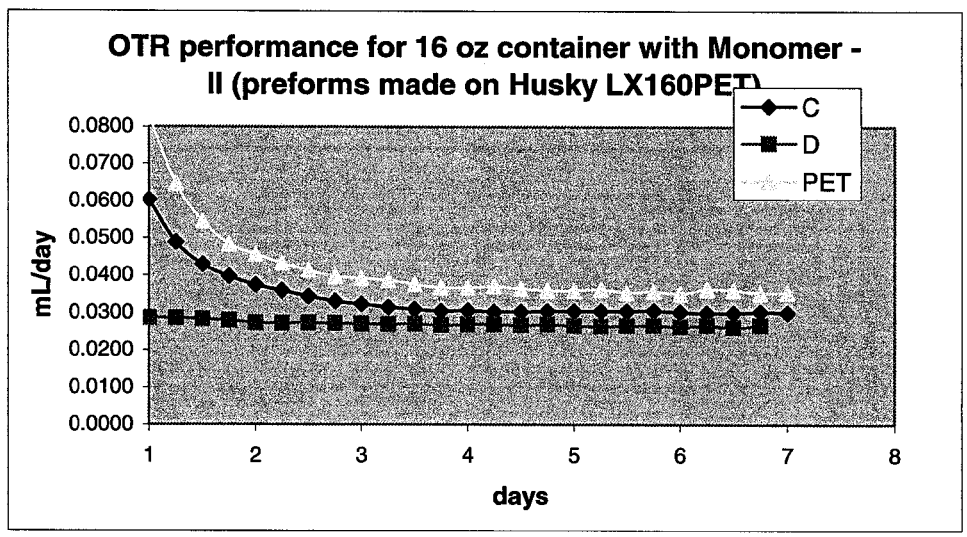
FIG. 5 shows oxygen permeation of bottles containing monomer-II that were mounted 3 days after manufacture and 47 days after manufacture.

Monomer-II Trial Results:

Preforms were molded using Monomer-II material at 3% let down on the Husky molding machine and 16 oz bottles were blown using RHBL. Two sets of bottles were mounted on an oxygen permeation measuring device—similar to MoCon Oxtran analyzer—after being stored empty at STP conditions. The first set (C) were mounted 3 days after manufacture, and the second set (D) were mounted 47 days after manufacture. Results are shown in FIG. 5.

Example 3

Preforms were made on Husky LX 160 PET, 2 cavity machine using the following formulation: Vitiva™ PET+3% N,N' Bis(phenylmethyl) hexane diamide (Monomer-I)+75 ppm Co. Vitiva PET and Monomer-I powder were tumble blended in a bucket and fed into the machine hopper. Cobalt-NDA dispersed in a liquid hydrocarbon carrier, was introduced using a ColorMatrix brand positive displacement pump. Actual final composition in the preform was verified by performing Nitrogen and ICP analysis Bottles were blown on a unit cavity 16 oz blow mold using a Sidel SBO-1 machine. Bottles were blown and were mounted on an oxygen permeation measuring device—similar to MoCon Oxtran analyzer—13 days after manufacture.

Figure 6:
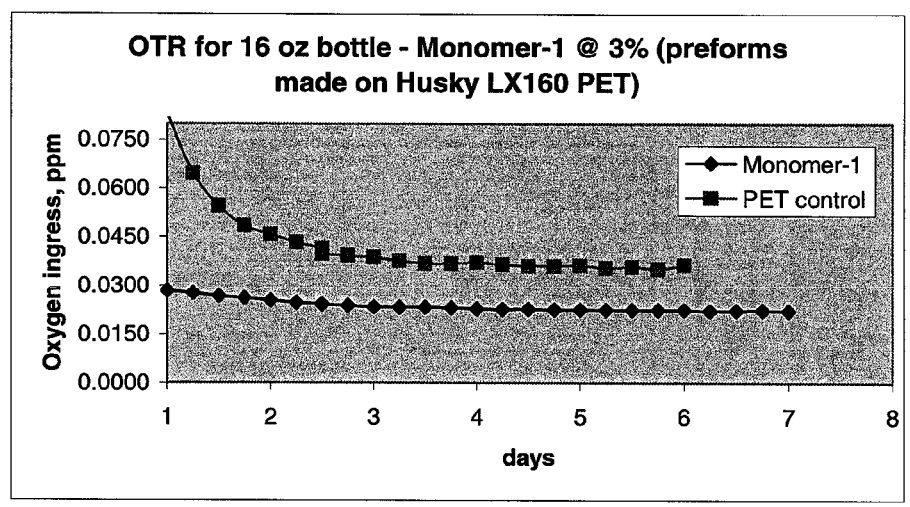
FIG. 6 shows evidence of scavenging for compositions containing monomer-I.

Trial Results:

The graph in FIG. 6 shows the OTR performance.

Figure 7:
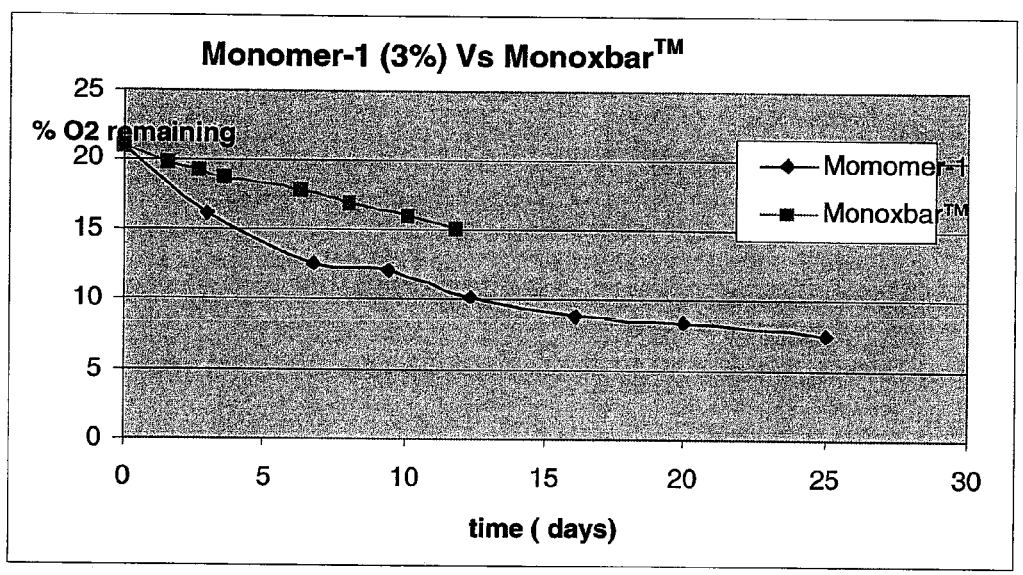
FIG. 7 shows the decrease in oxygen concentration over time for a 3% Monomer-I blend compared to a typical Monoxbar™ MXD6-Co$^{++}$-PET blend composition used by Constar in packaging applications.

As can be seen from the graph in FIG. 6, some scavenging is evidenced. In order to determine the scavenging potential, samples from the side wall of the container were sealed into a 20 mL vial and decrease in oxygen % over time was measured using oxy-sense. The graph in FIG. 7 shows the decrease in oxygen concentration over time for a 3% Monomer-I blend compared to a typical Monoxbar™ MXD6-Co$^{++}$-PET blend composition used by Constar in packaging applications.

Trial Results:

Monomer-I content was measured by performing a nitrogen analysis (Leco method) while the cobalt content was determined using inductively coupled plasma emission spectroscopy (ICPES) analysis. The results are as follows:

Diamide content: 2.6-2.7%
Co content: 63-71 ppm

Decrease in oxygen concentration observed using the vial test provides evidence for the scavenging ability/potential of Monomer-I in a monolayer blend construction with PET as the base resin. It also suggests possible influences of processing conditions on scavenging.

Example 4

Further tests were performed to evaluate thermal effect in manufacturing preforms on an Arburg machine (different platform) to look at the effect of processing on scavenging. Differences between Husky and Arburg injection machines used for the trials are summarized below:

|  | Husky | Arburg |
|---|---|---|
| Screw Diameter | 42 mm | 25 mm |
| Injection unit | P type | RS type |
| Hot-runner | Yes | No |
| # of shots | 12-13 | 2-3 |
| Cycle time | 25-26 s | 37-39 s |
| Approx. Residence time | 250-300 s | 80-120 s |

Trial Results:

Preforms were manufactured using the 20 oz 38 g preform tooling on a single cavity, 70 ton Arburg injection machine. Preforms were made by tumbling PET pellets, Monomer-I powder and Cobalt carboxylate powder. The following formulations were used:

1. PET+3% Monomer-I+75 ppm Co

2. PET+5% Monomer-I+75 ppm Co

Figure 8:
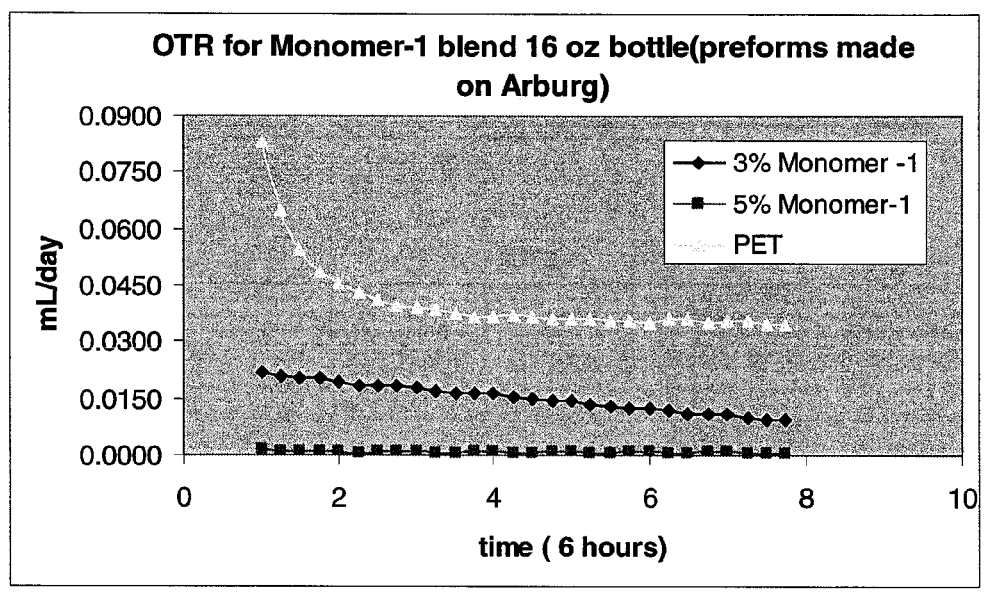
FIG. 8 shows oxygen permeation rates for 16 and 20 oz hot-fill containers that were mounted on an oxygen permeation measuring device 10 days later after being stored empty at standard temperature and pressure (STP) conditions.

Preforms were converted into 16 and 20 oz hot-fill containers and were mounted on an oxygen permeation measuring device—similar to MoCon Oxtran analyzer—10 days later after being stored empty at STP conditions. Results are shown in the graphs in FIG. 8.

The clarity of the bottles produced are excellent with measured OTR results being as much as an order of magnitude better than the former examples, and the induction period is not evident.

Monomer-I content was measured by performing a nitrogen analysis (Leco method) while the cobalt content was determined using ICPES analysis for bottles tested on the oxygen permeation apparatus. The results are as follows:

| Monomer % | Co (ppm) | OTR (mL/day) Day 7 |
|---|---|---|
| 2.89 | 72 | 0.0064 |
| 2.66 | 70 | 0.0121 |
| 4.28 | 67 | 0.0011 |
| 3.82 | 56 | 0.0004 |

Example 4

Trial Results

A validation trial was performed by manufacturing preforms with 4% monomer-1 content. As previously done, preforms were manufactured using the 20 oz 38 g preform tooling on a single cavity, 70 ton Arburg injection machine. Preforms were made by tumbling PET pellets, monomer-1 powder and Cobalt carboxylate powder. The following formulation was used: PET+4% Monomer-I+75 ppm Co.

Figure 9:
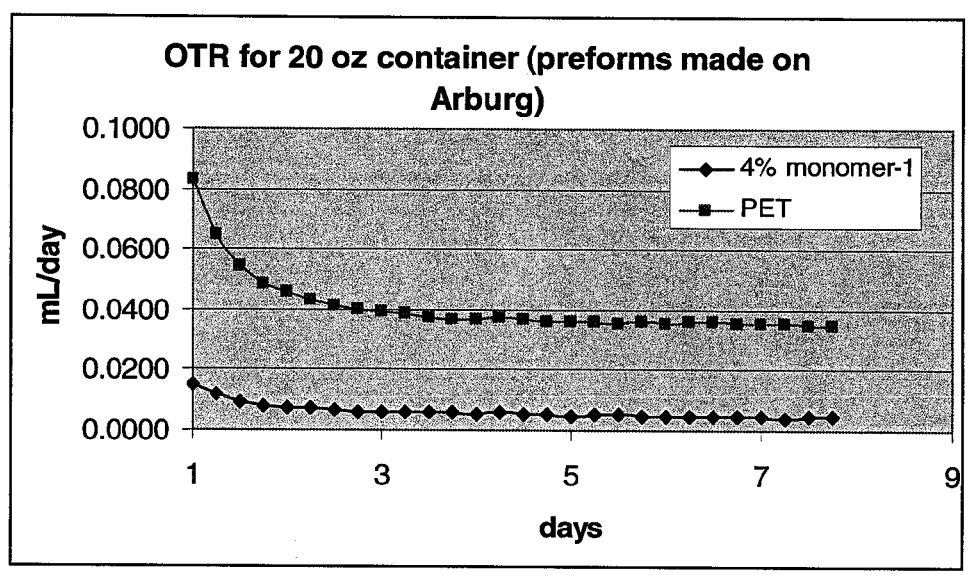
FIG. 9 shows oxygen permeation rates for 20 oz bottles were blown from preforms and stored empty for 25 days at STP conditions prior to testing.

20 oz bottles were blown from preforms and stored empty at STP conditions prior to testing. Bottles were blown and were mounted on an oxygen permeation measuring device—similar to MoCon Oxtran analyzer 25 days later. Results are shown in FIG. 9.

Figure 10:
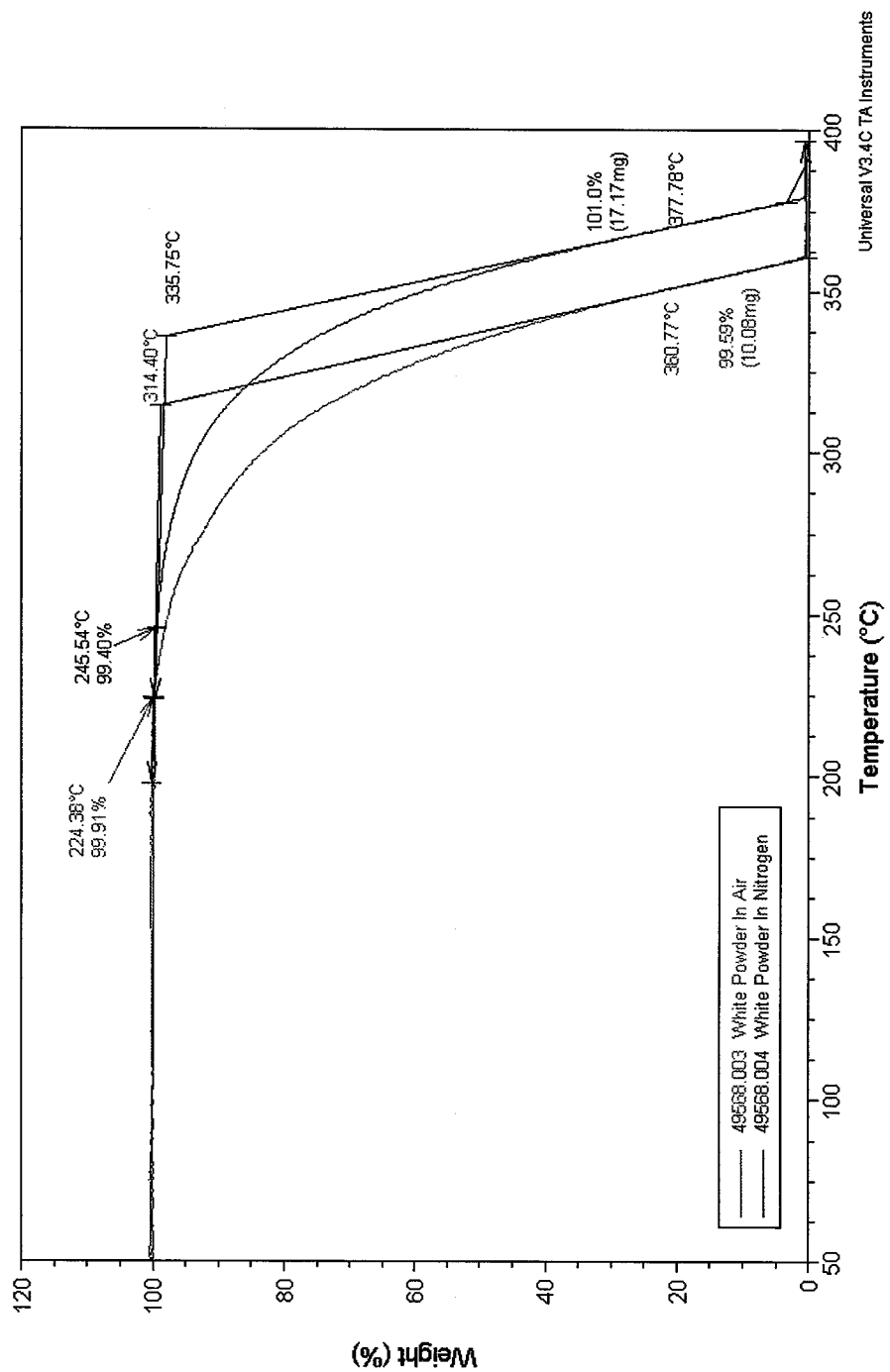
FIG. 10 presents a thermogravimetric analysis (TGA) that shows the effect of residence time on the Monomer-I decomposition in the extruder.

It is evident from the above examples that processing during injection molding (extruder sizing, residence time, screw type, injection set-up etc.) have a strong influence on oxygen scavenging performance. In order to understand the effect of residence time on the Monomer-I decomposition in the extruder, a thermogravimetric analysis (TGA) was performed. A known sample weight was placed in the pan and the sample heated at a known rate of 10 Deg C./min. and the weight loss that occurs was recorded. This experiment was performed both in nitrogen and air atmosphere. The resultant scans are shown in FIG. 10.

Figure 11:
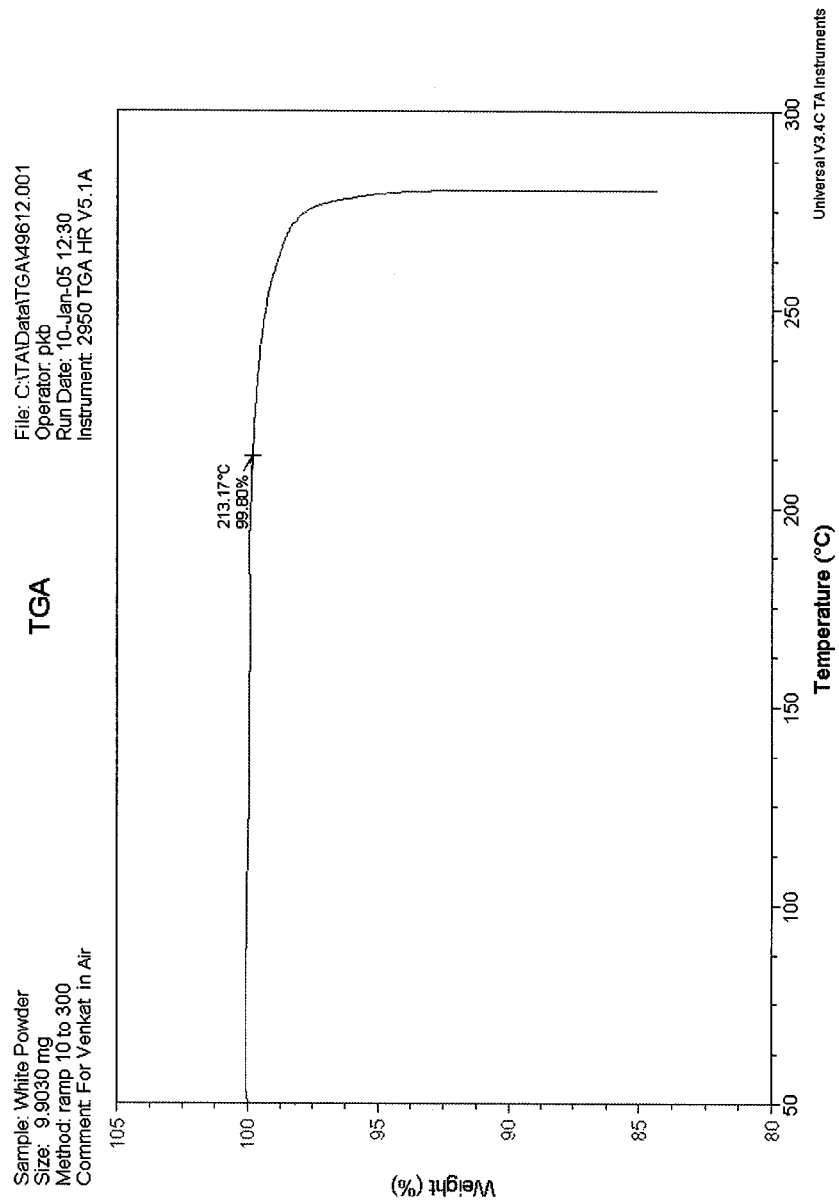
FIG. 11 shows a TGA analysis where a known weight sample of Monomer-I was placed in a sample pan and the sample quickly heated (40° C./min heating rate was used) to 280° C. The sample temperature was maintained at 280° C. for a period of 300 seconds (to simulate typical residence time in the extruder) and the resulting TGA scan was recorded.

It is clear that the Monomer-I material would undergo some thermal decomposition in the extruder conditions typically used for the manufacture of PET preforms. In order to understand this further, a known weight sample of Monomer-I was placed in the sample pan and the sample quickly heated (40° C./min heating rate was used) to 280° C. The sample temperature was maintained at 280° C. for a period of 300 seconds (to simulate typical residence time in the extruder) and the resulting TGA scan was recorded. The scan is reproduced in FIG. 11.

Results obtained from thermo gravimetric analyzer shown in the above examples, seem to suggest that the residence time would negatively influence the oxygen scavenging performance due to the Monomer-I partly undergoing thermal decomposition. This correlates well with the scavenging performance seen with Husky and Arburg injection platforms.

Example 5

A design of experiment (DOE) trial was performed on a production injection machine to evaluate the effect of monomer-1 content and process conditions on bottle performance particularly oxygen scavenging. A 9 run factorial experiment was performed with 4 factors—monomer-1 content, cobalt content, extruder temperature and cycle time. Previous work had shown that the material is sensitive to extruder temperature and residence time and the DOE was planned to study the effect of processing parameters as well as any interaction effect between the different factors.

Test Plan—Experiment #1

Preforms were made on Husky XL 300 PET machine equipped with a 48 cavity 38 g preform mold. The monomer-1 material was pre-blended with Cobalt NDA at desired let-downs and was fed using a suitable powder feeder (K-tron feeder). The DOE matrix is shown in the table below. The responses measured were oxygen transmission rate (Illiop), % oxygen remaining (oxy-sense), IV, and crystallization characteristics (onset).

| Std | Run | Block | Factor 1 A: Diamide % | Factor 2 B: Cobalt content ppm | Factor 3 C: Temperature Deg C. | Factor 4 D: Cycle time sec |
|---|---|---|---|---|---|---|
| 7 | 1 | Block 1 | 1.5 | 150 | 285 | 27 |
| 6 | 2 | Block 1 | 3 | 50 | 285 | 27 |
| 1 | 3 | Block 1 | 1.5 | 50 | 265 | 27 |
| 8 | 4 | Block 1 | 3 | 150 | 285 | 37 |
| 2 | 5 | Block 1 | 3 | 50 | 265 | 37 |
| 3 | 6 | Block 1 | 1.5 | 150 | 265 | 37 |
| 5 | 7 | Block 1 | 1.5 | 50 | 285 | 37 |
| 9 | 8 | Block 1 | 2.25 | 100 | 275 | 32 |
| 4 | 9 | Block 1 | 3 | 150 | 265 | 27 |

Figure 12:
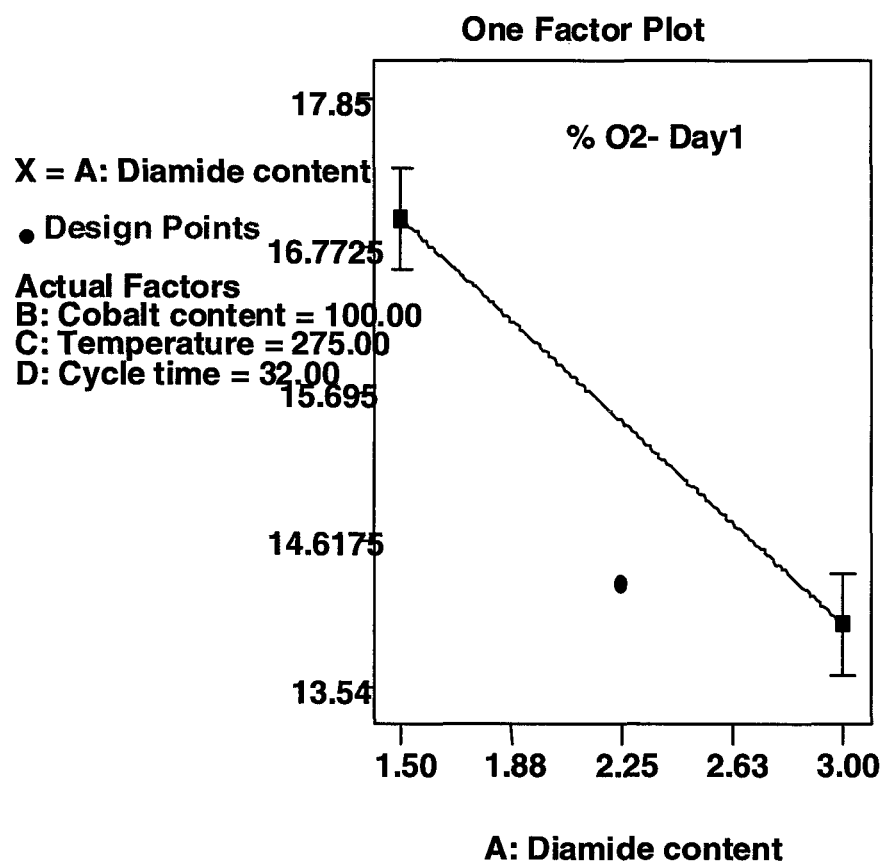
FIGS. 12 and 13 show the percentage oxygen remaining in the vial after one day as a function of % diamide content and cobalt content.
Figure 13:
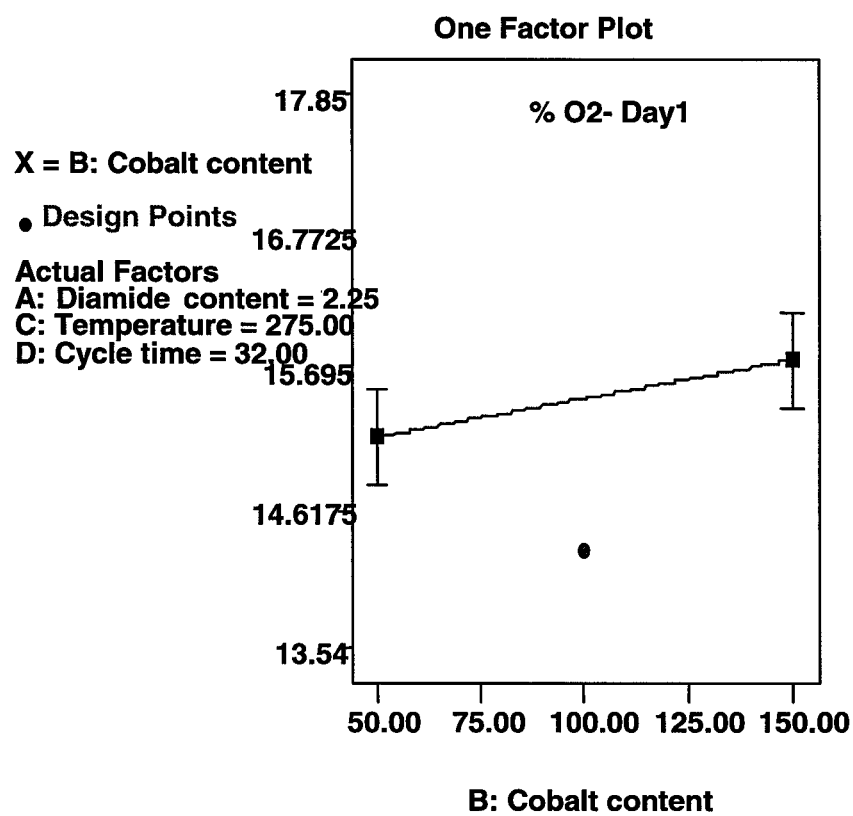

The results were analyzed using a statistical program (Stat-Ease). FIG. 12 shows the % oxygen remaining after Day 1 using oxy-sense (scavenging speed). Analysis shows that increasing the diamide content results in less oxygen remaining in the vial (more scavenging). Interestingly, increasing the cobalt content results in slight increase in oxygen remaining in the vial (FIG. 13). This might indicate presence of an optimum cobalt level between 50 and 150 ppm for best scavenging.

Figure 14:
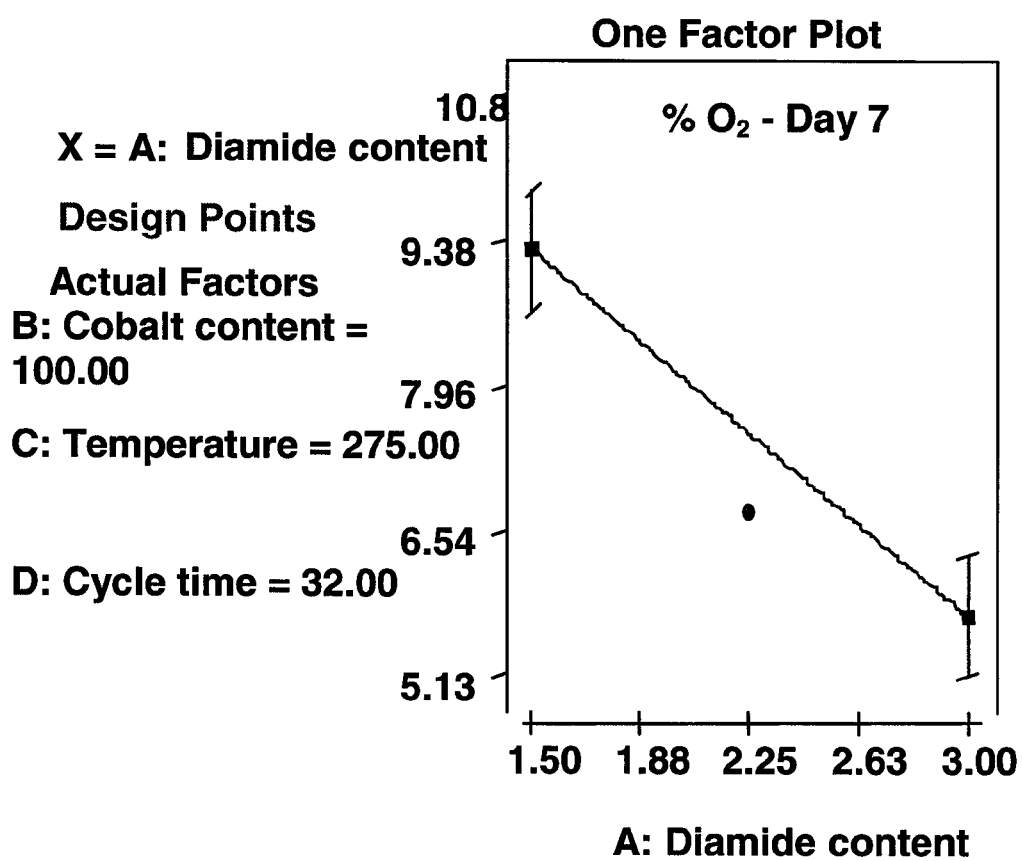
FIGS. 14 and 15 illustrate the effect of diamine content and extruder temperatures on the oxygen remaining in the vial after 7 days.
Figure 15:
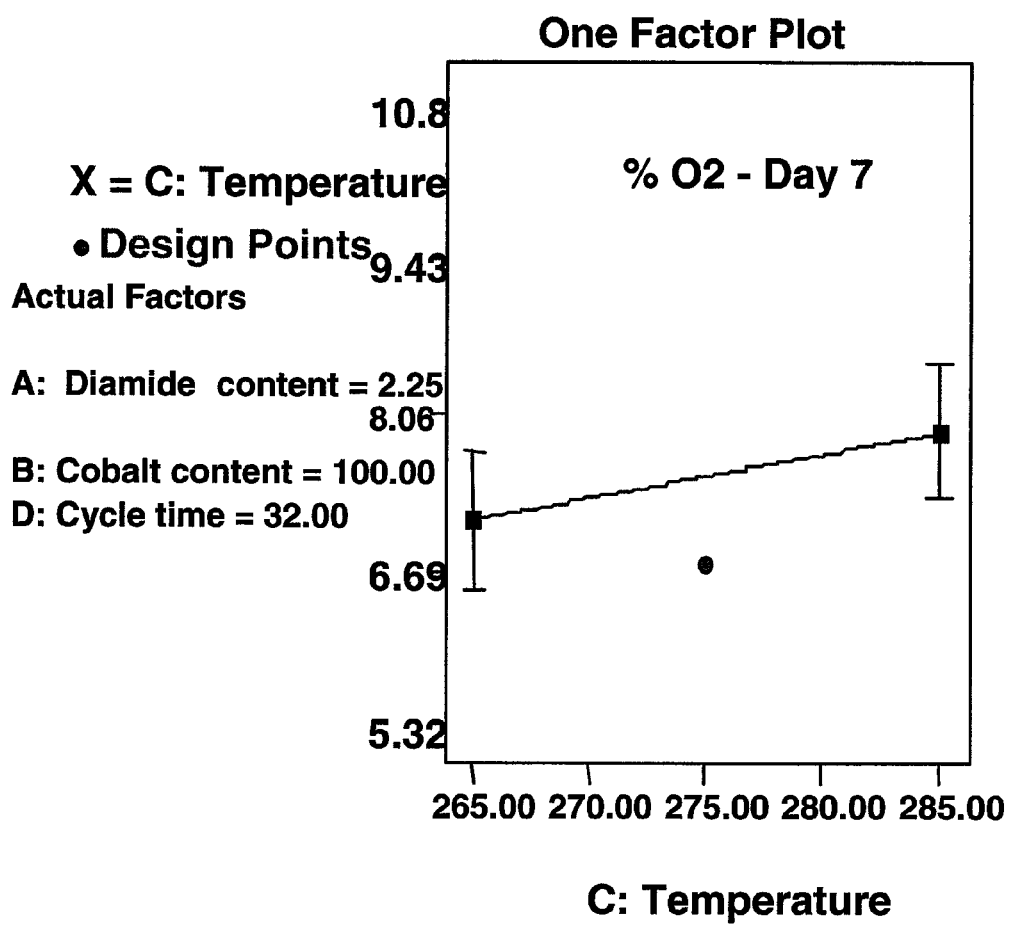

FIGS. 14 and 15 below show the effect of diamide content and extruder temperatures on the amount of oxygen remaining in the vial after 7 days (scavenging capacity). Increasing the diamide content results in higher scavenging capacity. Interestingly, higher extruder temperatures show a slight reduction in % oxygen remaining in the vial. This could potentially be due to some of the diamide material being already reacted in the extruder and resulting in less material available for scavenging after bottle manufacture.

Figure 16:
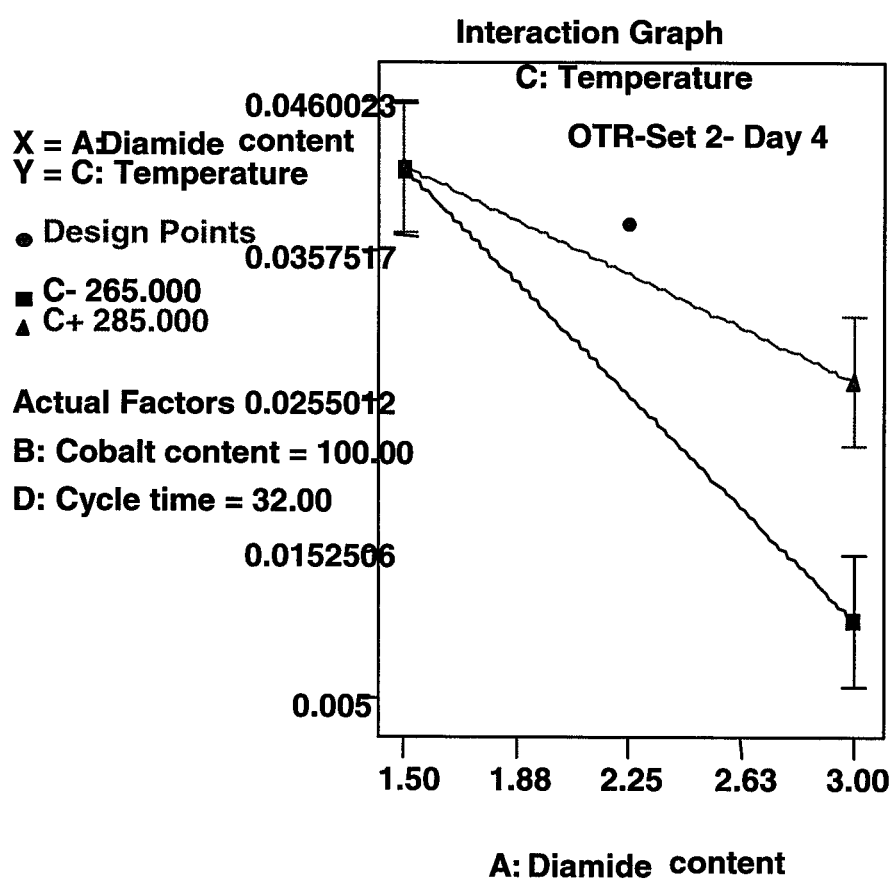
FIGS. 16 and 17 show the interaction of diamide content, extruder temperatures, and injection cycle time.
Figure 17:
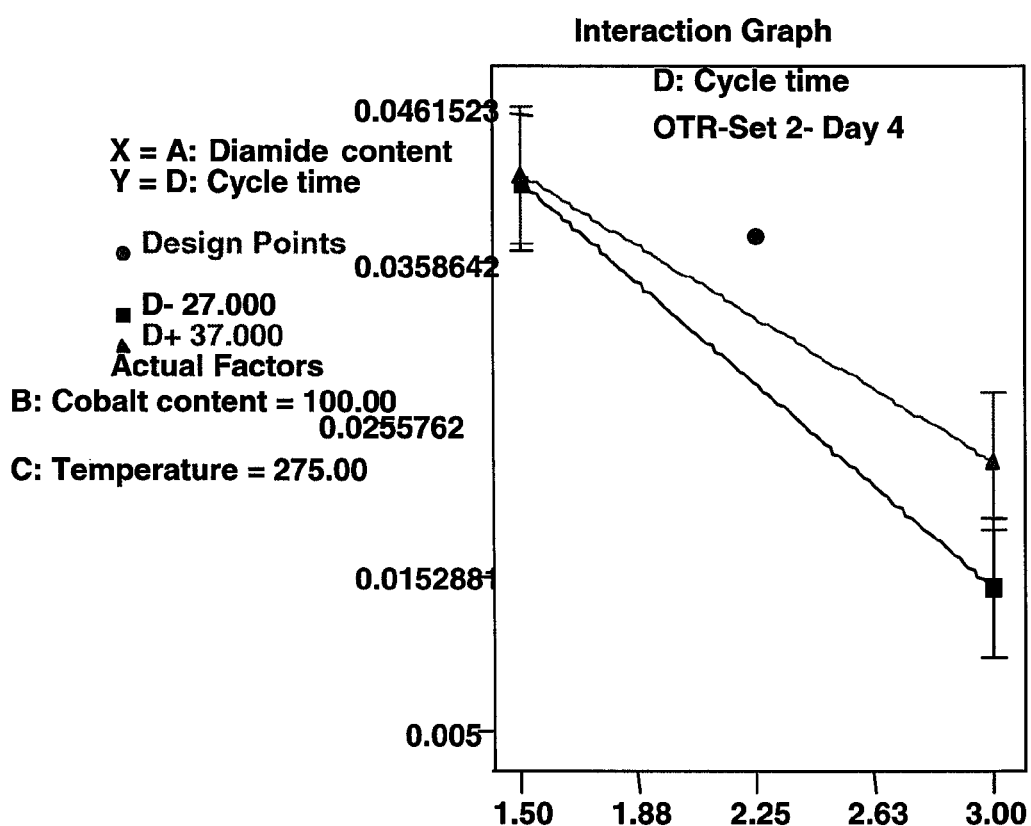

Bottles were also mounted on Illiop to get actual oxygen transmission rate (mL/pkg/day) measurements and were input into the DOE software for analysis. There were interaction effects between diamide content, extruder temperatures and injection cycle time. Interaction effect plots are shown in FIGS. 16 and 17.

It can be seen that both increasing the extruder temperature and cycle time (residence time) result in higher OTR (less effective scavenging). Again this seems to indicate that part of the material is already reacted in the extruder and less is actually available for scavenging after the bottle manufacture.

Figure 18:
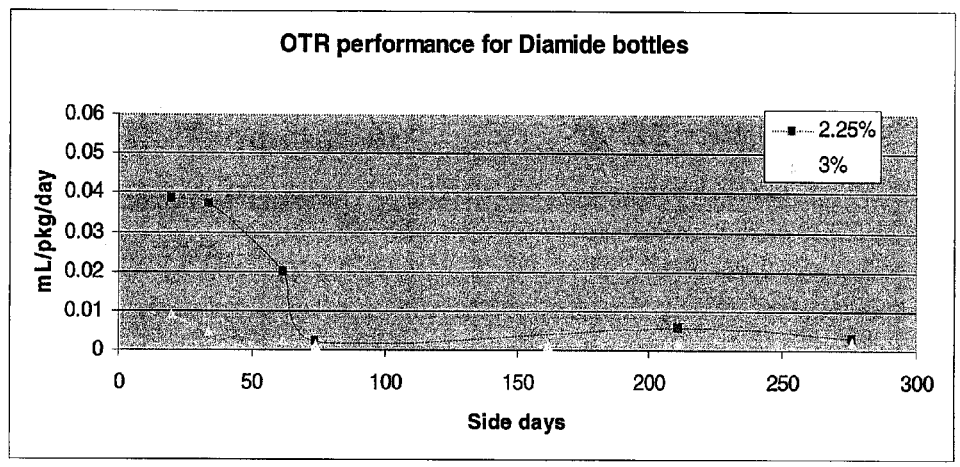
FIG. 18 shows oxygen scavenging performance over time.

In order to understand the oxygen scavenging performance over a long time, bottles from Run #8 (2.25%) and Run #9 (3.0%) were mounted on the Illiop at regular time intervals and the oxygen scavenging performance monitored (FIG. 18).

Test Plan: Experiment #2

In order to understand the effect of PET type (PET-1 is PET type 1, PET-2 is PET type 2, and PET-3 is PET type 3) on scavenging, bottles were made with following formulations:

PET-1+2.5% monomer-1+75 ppm Co@270 Deg C. extruder temperature

PET-1+2.5% monomer-1+75 ppm Co@290 Deg C. extruder temperature

PET-2+2.5% monomer-1+75 ppm Co@280 Deg C. extruder temperature

PET-3+2.5% monomer-1+75 ppm Co@280 Deg C. extruder temperature

Figure 19:
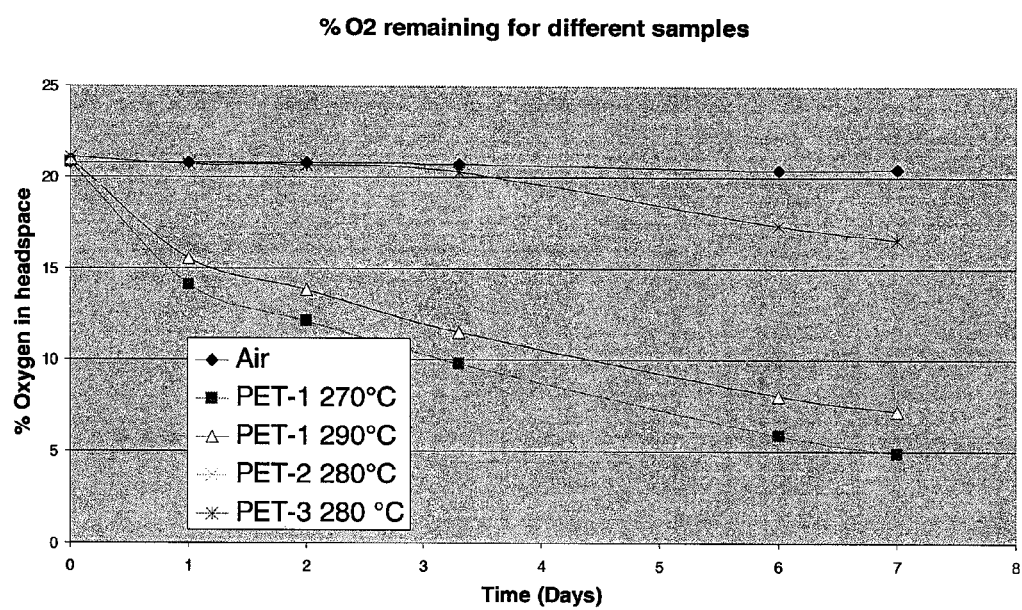
FIG. 19 shows the effect of PET type in oxygen scavenging performance.

PET-1: High CHDM co-polymer resin with UVI/little re-heat additives
PET-2: IPA modified co-polymer no UVI/re-heat additives
PET-3: CHDM modified co-polymer with high amounts of re-heat additive Samples were cut from the side-wall of the bottle and sealed in 20 mL vials and the scavenging performance was tested using oxy-sense (FIG. 19). It is clear that proper selection of PET is important in achieving the optimum oxygen scavenging performance. PET-1 seems to be the preferred PET of choice for optimized performance for a given formulation.

All patents, patent applications and publications described herein are incorporated by reference in their entirety.

What is claimed:

1. A wall of a package comprising at least one layer, the layer comprising a composition, the composition comprising:
    (a) at least one base polymer comprising a polyester polymer;
    (b) at least one non-polymeric oxidizable organic component present in an amount of about 0.10 to 10 weight present of the composition and the component comprising at least one compound of the formula E-(L-E)$_x$ wherein:

E is $$(R_1)_n-Ar \underset{R_3}{\overset{R_5}{\underset{|}{\underset{N}{\text{-}}}}} \underset{R_6}{\overset{O}{\underset{|}{\text{-}}}} \underset{R_8}{\overset{R_7}{\underset{|}{\text{-}}}} \underset{O}{\overset{R_9}{\underset{|}{\text{-}}}} \underset{R_{10}}{\overset{R_4}{\underset{|}{\underset{N}{\text{-}}}}} -Ar-(R_2)_p \quad (I)$$

L is a linking group of the formula $-(O-R_{21})_z-O-$, $-(NH-R_{21})_z-NH-$, $-(NH-C(=O)R_{22})_t-NH$, $-NH-R_{25}-NH(C(=O)R_{26}NHR_{25}NH)_u-$, $-(O-R_{23}-O-R_{24}-C(=O))_s-O-$ where L is attached to a carbon atom of Ar in structure (I);
    x is 0, 1, or 2;
    Ar is aryl or heteroaryl;
    $R_1$, $R_2$, are each independently, H, $C_1$-$C_{12}$ alkyl, $C_1$-$C_6$ alkoxy, $C_6$-$C_{20}$ aryloxy, hydroxy, $C_2$-$C_6$ alkenyl, $NR_{19}R_{20}$, acetyl, nitro, glyceryl, carbohydrate, $-C(=O)H$, L, or two $R_1$ or two $R_2$ groups can form a group of the formula $-O-R_{18}-O$;
    $R_3$, $R_4$ are each H;
    $R_5$ to $R_{10}$ are each, independently, H or $C_1$-$C_3$ alkyl;
    $R_{18}$ is $C_2$-$C_6$ alkyl;
    $R_{19}$ and $R_{20}$ are each, independently, H, $C_1$-$C_6$ alkyl, or $C_6$-$C_{20}$ aryl;
    $R_{21}$ and $R_{24}$ are each, independently, $C_1$-$C_6$ alkyl;
    $R_{22}$, $R_{23}$, $R_{25}$ and $R_{26}$ are each, independently, $C_1$-$C_6$ alkyl or $C_6$-$C_{20}$ aryl;
    n and p are independently 0 or an integer from 1 to 5;
    s and z are, independently 1, 2, or 3;
    t and u are, independently 1 or 2; and
    (c) at least one transition metal in a positive oxidation state, the metal being present in the composition in an amount of 10 to 400 ppm;
    and wherein the permeability for oxygen of the composition is not more than about 3.0 cm$^3$mm/(m$^2$atmday).

2. The wall of a package of claim 1, wherein the compound of the formula E-(L-E)$_x$ is $$(R_1)_n \underset{R_3}{\overset{R_5}{\underset{|}{\underset{N}{\text{-}}}}} \underset{R_6}{\overset{O}{\underset{|}{\text{-}}}} \underset{R_8}{\overset{R_7}{\underset{|}{\text{-}}}} \underset{O}{\overset{R_9}{\underset{|}{\text{-}}}} \underset{R_{10}}{\overset{R_4}{\underset{|}{\underset{N}{\text{-}}}}} (R_2)_p.$$

3. The wall of a package of claim 2, where n and p are each 0, 1, or 2 and $R_1$ and $R_2$ are each independently H, $C_1$-$C_4$ alkyl, hydroxy, $C_1$-$C_3$ alkoxy, or carbohydrate.

4. The wall of a package of claim 3, wherein $R_1$ and $R_2$ are each independently H, methyl, ethyl, hydroxy, methoxy, ethoxy, or glucose.

5. The wall of a package of claim 3, where $R_5$ to $R_{10}$ are H.

6. The wall of a package of claim 3, where $R_1$ and $R_2$ are each H.

7. The wall of a package of claim 1, wherein the compound of the formula E-(L-E)$_x$ is:

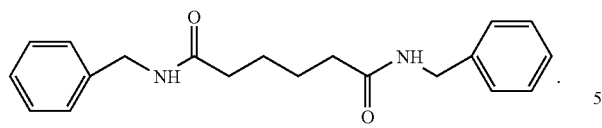

8. The wall of a package of claim 1, wherein the at least one transition metal is cobalt.

9. The wall of a package of claim 8, wherein the at least one transition metal further comprises zinc.

10. The wall of a package of claim 1, wherein the polyester polymer is polyethylene terephthalate.

11. The wall of a package of claim 1, wherein the oxidizable organic component is present in an amount of about 1 to about 10 weight percent based on the weight of the composition.

12. The wall of a package of claim 1, wherein the oxidizable organic component is present in an amount of about 1 to about 5 weight percent based on the weight of the composition.

13. The wall of a package of claim 1, wherein the oxidizable organic component is present in an amount of about 1 to about 3 weight percent based on the weight of the composition.

14. The wall of a package of claim 1, wherein the concentration of transition metal is 30 to 150 ppm.

\* \* \* \* \*